United States Patent [19]

Staley

[11] Patent Number: 5,385,755
[45] Date of Patent: Jan. 31, 1995

[54] APPARATUS AND METHODS FOR CURING AN ADHESIVE PROMOTER ON A WINDSHIELD

[75] Inventor: Jack B. Staley, Grand Rapids, Mich.

[73] Assignee: Safelite Glass Corporation, Columbus, Ohio

[21] Appl. No.: 965,160

[22] Filed: Oct. 23, 1992

[51] Int. Cl.⁶ .................................. B05D 3/02
[52] U.S. Cl. ........................ 427/379; 427/377; 427/389.7
[58] Field of Search ............... 427/377, 284, 163, 379, 427/165, 207.1, 208.2, 287, 389.7

[56] References Cited

U.S. PATENT DOCUMENTS

| | | | |
|---|---|---|---|
| 4,085,238 | 4/1978 | Chenel et al. | 427/208.2 |
| 4,284,751 | 8/1981 | Hutt et al. | 427/387 |
| 4,471,007 | 9/1984 | Pate | 427/377 |
| 4,480,581 | 11/1984 | Simmonds, Jr. et al. | 427/208.2 |
| 4,511,626 | 4/1985 | Schumacher | 427/409 |
| 4,530,882 | 7/1985 | Homan et al. | 427/208.4 |
| 4,561,625 | 12/1985 | Weaver | 249/85 |
| 4,567,107 | 1/1986 | Rizk et al. | 427/163 |
| 4,605,569 | 8/1986 | Shimada et al. | 427/284 |
| 4,648,832 | 3/1987 | Reilly et al. | 425/543 |
| 4,662,113 | 5/1987 | Weaver | 49/404 |
| 4,688,752 | 8/1987 | Barteck et al. | 249/85 |
| 4,732,553 | 3/1988 | Hofer | 425/116 |
| 4,755,339 | 7/1988 | Reilly et al. | 264/252 |
| 4,761,916 | 8/1988 | Sanok et al. | 49/381 |
| 4,762,481 | 8/1988 | Weaver | 425/116 |
| 4,777,699 | 10/1988 | Hill et al. | 16/225 |
| 4,826,417 | 5/1989 | Reilly et al. | 425/116 |
| 4,835,012 | 5/1989 | Saur | 427/284 |
| 4,839,122 | 6/1989 | Weaver | 264/129 |
| 4,854,599 | 8/1989 | Barteck | 277/227 |
| 4,915,395 | 4/1990 | Barteck | 277/12 |
| 5,169,720 | 12/1992 | Braatz et al. | 427/207.1 |
| 5,236,650 | 8/1993 | Choby et al. | 427/377 |
| 5,276,957 | 1/1994 | Murphy et al. | 427/377 |
| 5,296,561 | 3/1994 | Babu et al. | 427/208.4 |

FOREIGN PATENT DOCUMENTS

| | | | |
|---|---|---|---|
| 48912 | 12/1989 | Japan | 427/377 |

*Primary Examiner*—Shrive Beck
*Assistant Examiner*—Diana Dudash
*Attorney, Agent, or Firm*—Berne S. Broadbent; Gary D. E. Pierce

[57] ABSTRACT

A method for curing an adhesive promoter onto glass. An adhesive promoter having a solvent carrier is first applied to the glass, and the treated glass is introduced into a first chamber maintaining an environment with temperature between approximately 93° C. and 127° C. (200° F. and 260° F.) to flash off the adhesive promoter's solvent carrier. The glass is then introduced into a second chamber maintaining an environment for heating and humidifying the glass with temperature between approximately 65° C. and 93° C. (150° F. and 200° F.) and humidity between approximately 80 and 90 percent for hydrolysis to promote the formation of a laminate on the edge of the glass. Thereafter, the glass is introduced into a third chamber maintaining an environment with temperature between approximately 93° C. and 121° C. (200° F. and 250° F.) to dry the glass and evaporate the water from the laminate. The glass is retained in each of the chambers for a period of approximately 3 to 4 minutes.

11 Claims, 3 Drawing Sheets

APPARATUS AND METHODS FOR CURING AN ADHESIVE PROMOTER ON A WINDSHIELD

BACKGROUND

1. Field of the Invention

This invention relates to windshield encapsulation and, more particularly, to apparatus and methods for curing an adhesive promoter on a windshield in preparation for encapsulation.

2. The Background Art

Traditionally, the methods used to encapsulate a windshield for introduction into an automobile involve adding an adhesive sealant and a trim to the outside edges of a windshield, while the windshield is still on the assembly line. More particularly, the prior art offered methods consisting of the addition of an adhesive sealant to the windshield, an application of a decorative trim to the peripheral edges of the glass, and a plurality of mechanical fasteners or metal clips connecting the windshield to the vehicle frame to maintain the windshield within the channel-groove of the automobile. However, these traditional methods are characterized as being time consuming and labor intensive.

To improve the existing practices within the industry, a process of employing conventional gasket compression and injection molding techniques was introduced. However, because of the types of materials used in molding the gaskets, the conventional compression and injection molding techniques were later found to lack the proper adhesion qualities between the gasket and the metal body parts, as well as the gasket adhering to the peripheral edges of the windshield. The deficiency in proper adhesion between the windshield and the channel-groove of the automobile frame resulted in water leaks, wind noise, and other related problems. Thus, to accommodate the compression and injection molding techniques and the problems of insufficient adhesion, additional mechanical fasteners were needed to secure the windshield to the body panels.

Because of the disadvantages of improper adhesion, an improvement in prior art methods followed. A unitary windshield assembly consisting of a sheet of glass, an adjoining frame, and a casing or gasket of molded material, such as polyvinylchloride or urethane, was introduced to the industry. The unitary windshield became recognized as a significant improvement over the existing prior art methods because the windshield assemblies arrive at the point of installation, and are ready to be incorporated into the automobile.

These unitary window assemblies are typically made by encapsulating the edge of the windshield with a urethane gasket to which a frame may be attached. Whereby, the sheet of glass and the frame are retained collectively together. A number of fasteners may then be provided at spaced locations along the frame, such that the entire assembly may be guided into precise alignment over the channel-groove of the vehicle frame.

Several steps, however, are dictated before the urethane or polyvinylchloride gasket can be secured to the windshield. First, an adhesive promoter substance should be administered to the glass surface and then permitted to cure before the gasket is applied. Currently, the industry typically applies an adhesive promoter to the windshield, and stores the windshield in a high humidity setting for a period up to 24 hours to allow the windshield to cure before the gasket molding can be applied thereto.

Because the adhesive promoter must be allowed to completely cure before applying the urethane gasket, there are significant disadvantages in the existing curing practices. First and foremost, the present curing practices prove to be severely time consuming. Whereby, a windshield is customarily cured for a period of 24 hours after applying an adhesive promoter delineating a substantial period of time invested before the windshield is ready for encapsulation and introduction into the automobile.

An additional disadvantage involves the costs incurred for having to store the windshields in relatively large, high humidity rooms to cure the adhesion promoter properly. The size of the high humidity storage rooms become necessary to achieve any substantial output of cured windshields ready for encapsulation within a timely fashion.

Consequently, the current practices in the industry to cure the windshield assemblies for encapsulation are considerably labor intensive, requiring more than one employee to maneuver around the large racks of windshields undergoing the curing process. Unfortunately, the methods of curing large quantities of windshields at each setting, tend to produce a substantial number of defective products.

Considering all these factors, the known prior art methods involved in curing an adhesive promoter onto a windshield for encapsulation by a molded gasket before introduction into the automobile involve large investments of time, resources and manpower to produce quality products.

BRIEF SUMMARY AND OBJECTS OF THE INVENTION

In view of the foregoing, a primary object of the present invention is to provide a windshield curing apparatus and method for curing an adhesive promoter on a windshield in a shorter period of time.

It is also an object of the present invention to provide a windshield curing apparatus and method for curing an adhesive promoter on a windshield which does not involve high storage costs.

Further, it is an object of the present invention to provide a windshield curing apparatus and method for curing an adhesive promoter on a windshield which is not labor intensive.

It is still further an object of the present invention to provide a windshield curing apparatus and method for curing an adhesive promoter on a windshield which produces a more consistent product with fewer defects.

Consistent with the foregoing objects, and in accordance with the invention as embodied and broadly described herein, a windshield curing apparatus is disclosed in one embodiment of the present invention as including a main body separated by divider walls into four chambers which are rotated through four distinct environments.

In the main body, the divider walls extend radially from an axle along the center axis of the main body dividing the main body into four chambers of equal size. A direct current variable speed motor causes the axle to rotate substantially 90 degrees at a time. Thereby, the four chambers are rotated through the four distinct environments. In addition, the motor is controlled by double palm buttons attached at a distance apart on the exterior of the main body.

Each chamber includes a windshield holder comprising at least two posts extending radially from the axle separated by a suitable distance. One end of the posts is attached to the axle and a vacuum cup is attached to the opposite end of each post. An opening, large enough for a windshield to be placed in the curing apparatus, is provided in the main body coincident with the first environment for loading and unloading the windshields.

Heater units and a steam generator are attached to the main body of the windshield curing apparatus in different locations to control separate and distinct environments in three separate chambers. A second environment is maintained by a heater unit establishing a temperature between 200° F. and 260° F. to flash off the adhesive promoter's toluene carrier. A third environment is maintained at a temperature between 150° F. and 200° F. and at a humidity between 80 and 90 percent for hydrolysis by a separate heater unit and a steam generator. Finally, the fourth environment is maintained at a temperature between 200° F. and 250° F. to dry the windshield and to evaporate water from the laminate by another individual heater unit.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 2:
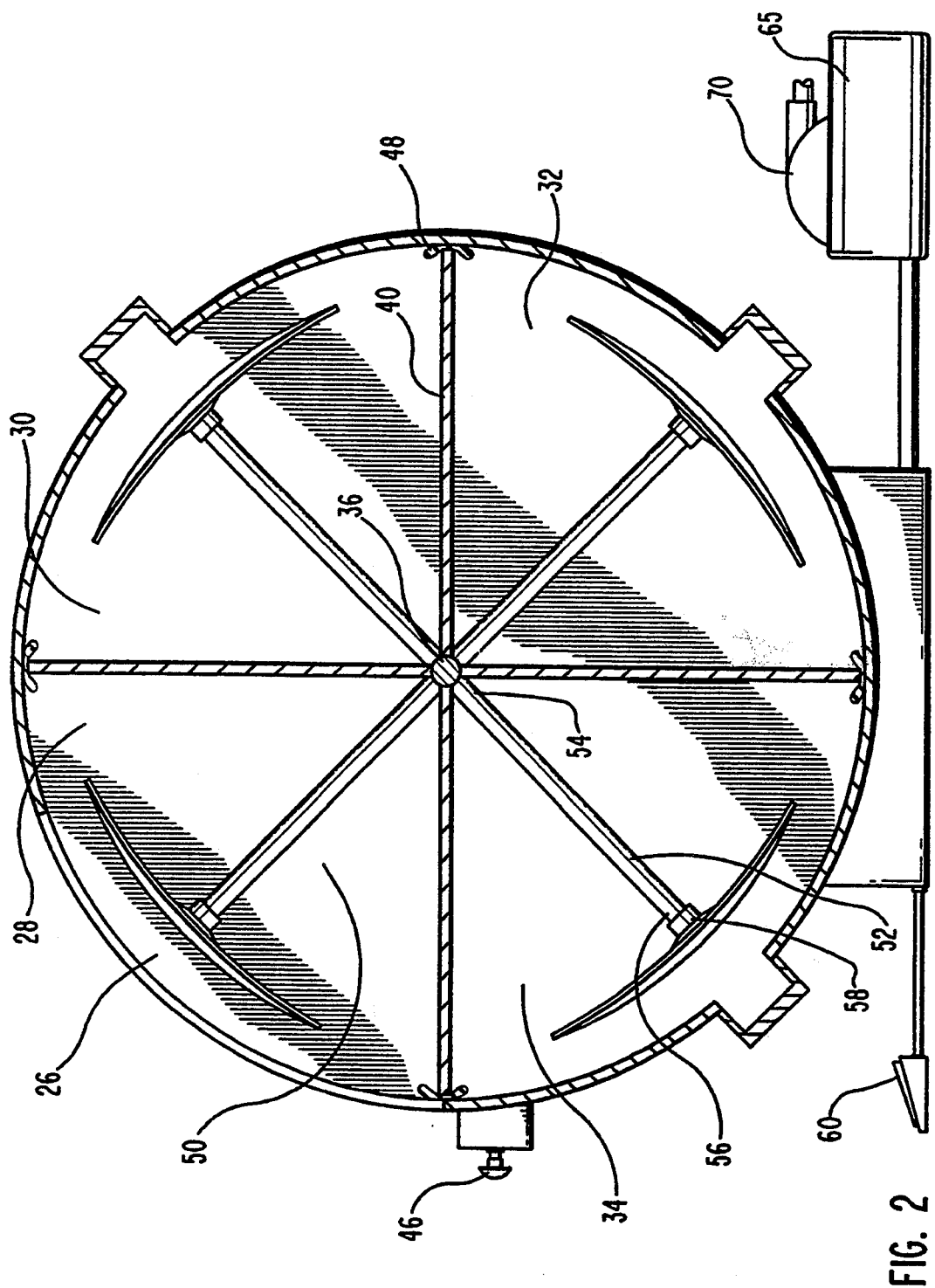
FIG. 2 is a cross-sectional view of the embodiment of FIG. 1 taken along lines 2—2 of FIG. 1.
Figure 3:
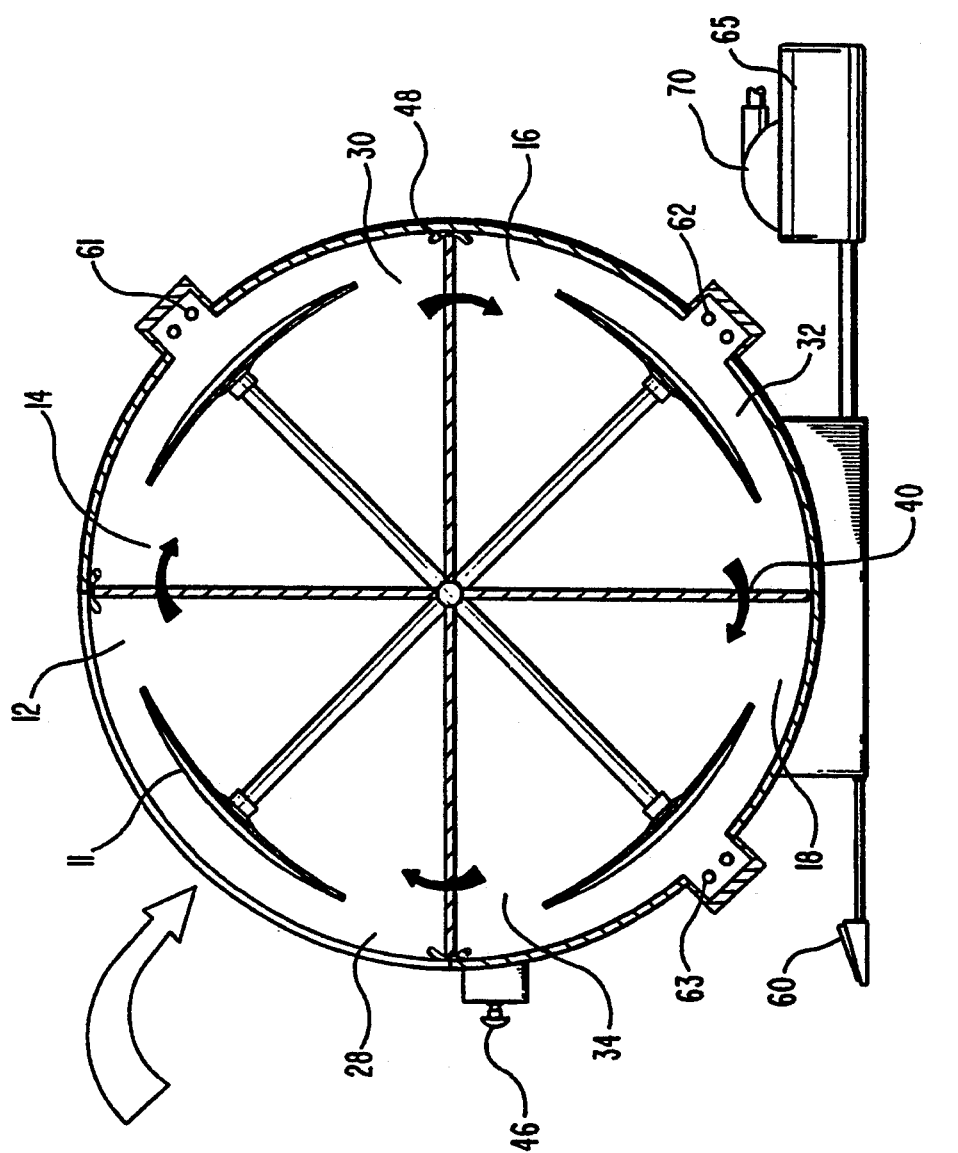
FIG. 3 is a cross-sectional view of the embodiment of FIG. 1 taken along lines 2—2 of FIG. 1, illustrating the rotation of the curing apparatus comprising a multiple of heater units and a steam generator.

It will be readily understood that the components of the present invention, as generally described and illustrated in the Figures herein, could be arranged and designed in a wide variety of different configurations. Thus, the following more detailed description of the embodiments of the apparatus and methods of the present invention, as represented in FIGS. 1 through 3, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
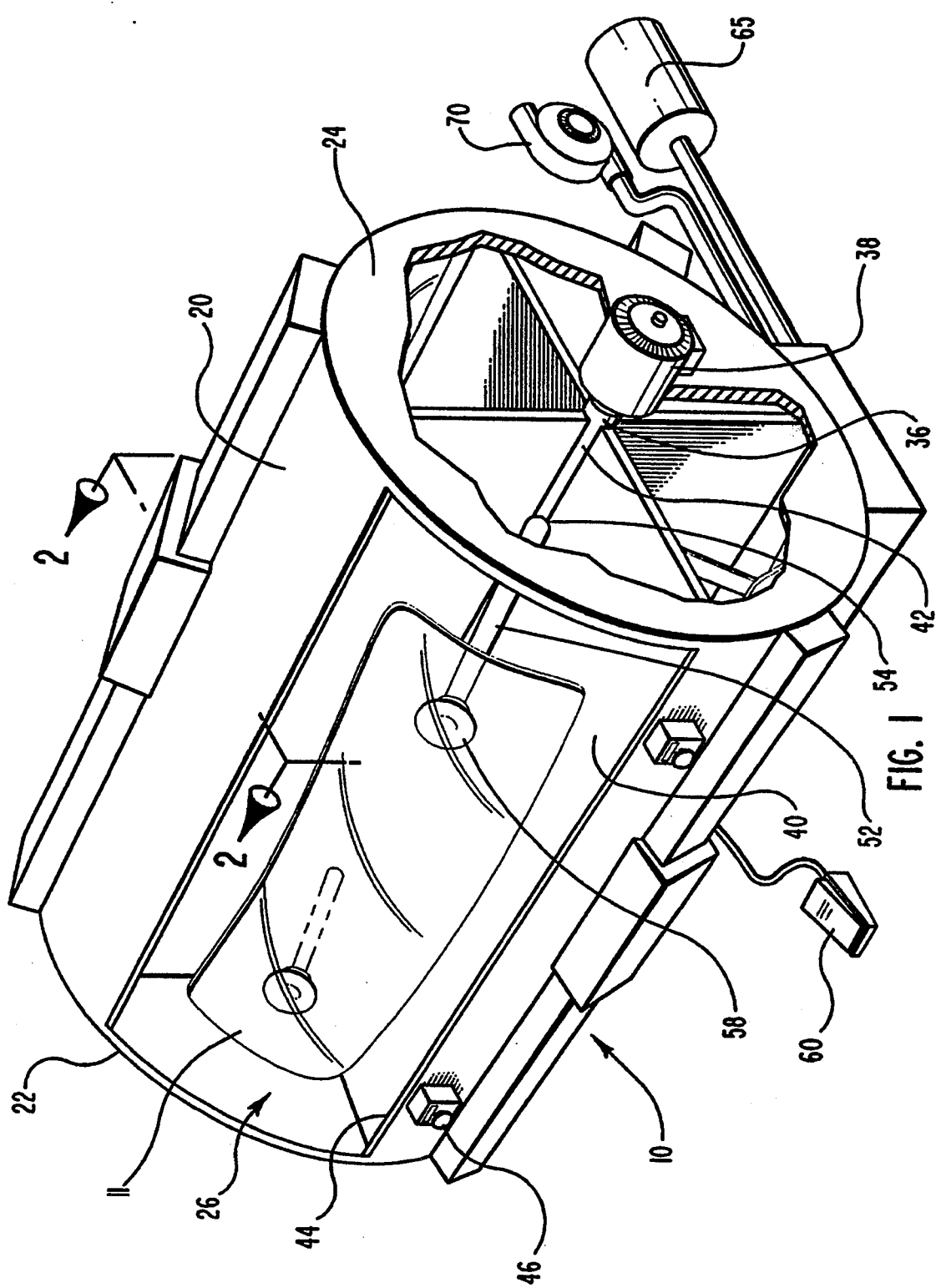
FIG. 1 is a perspective view illustrating one presently preferred embodiment of the windshield curing apparatus with a portion of one end of the apparatus cut away.

The windshield curing apparatus of the present invention, generally designated at 10, is shown in its entirety in FIG. 1. As shown, the windshield curing apparatus 10 comprises a main body 20 being a substantially hollow, closed container generally cylindrical in shape. The main body 20 has a back end 22 and a front end 24 positioned on opposing sides of the windshield curing apparatus 10.

An opening 26, large enough to allow a windshield 11 to be inserted therein, is provided on a side of the windshield curing apparatus 10 and extends between the back end 22 and the front end 24 of the main body 20. The opening 26 of the windshield curing apparatus 10 may be substantially rectangular in shape, however, it will be readily appreciated that other shapes or configurations are feasible.

An axle 36 running linear along the center axis of the main body 20, coexists between the back end 22 and the front end 24 of the windshield curing apparatus 10. Associated with the axle 36 through an opening in the front end 24 of the main body 20 is a motor 38 providing a source of power rotating the axle 36 in a substantially circular direction along the center axis of the main body 20. Said motor 38 may preferably be a direct current variable speed motor, but is not intended to be restricted thereby.

Divider panels 40, having a first 42 end and a second end 44, may be rigidly fastened by any suitable means at said first end 42 to the axle 36. Accordingly, the divider panels 40 extend radially outward from said axle 36. Although the divider panels 40 could, of course, be made from a wide variety of suitable materials, the preferred embodiment of the present invention provides divider panels 40 composed of stainless steel.

Said divider panels 40 apportion the main body 20 of the windshield curing apparatus 10 into preferably four distinct and separate chambers 28, 30, 32 and 34, as shown in FIG. 2. In addition, each divider panel 40 has an appropriate sealing means 48 fastened to the second end 44 of each panel 40 to ensure the four chambers 28, 30, 32 and 34 are environmentally separate and distinct.

Each chamber 28, 30, 32 and 34 of the windshield curing apparatus 10 may contain a windshield holder assembly 50. The windshield holder assembly 50 comprises at least one rigid support post 52 having a first end 54 and a second end 56. The preferred embodiment of the present invention illustrates a windshield holder assembly 50 comprising two rigid support posts 52. Said first end 54 of each support post 52 is rigidly attached to the axle 36, as shown in FIG. 2. On the second end 56 of each support post 52 is mounted a vacuum cup 58 secured thereto by a suitable fastening means.

As shown is FIG. 1, the support posts 52 being rigidly attached to the axle 36 of the main body 20 and extending outward therefrom, are positioned a substantial distance apart to allow a windshield 11 to be held and supported in place by the vacuum cups 58 mounted on the second end 56 of each support post 52. The lips of the vacuum cups 58 facilitate a suction-hold on the windshield 11 when an external vacuum pump 70 is activated. The second end 56 of the support post 52 may be extended to within at least six inches of the main body 20 for allowing adequate room when applying an adhesive promoter to the windshield 11.

As illustrated in FIG. 3, the main body 20 of the preferred embodiment may be apportioned into preferably four separate and distinct chambers 28, 30, 32 and 34 by the divider panels 40. Likewise, the main body 20 may also be separated into preferably four distinct environments 12, 14, 16 and 18. The four chambers 28, 30, 32 and 34 are rotated through the four environments 12, 14, 16 and 18 by the motor 38 attached to the axle 36 at the front end 24 of the main body 20. For rotating the chambers 28, 30, 32 and 34 through the distinct environments 12, 14, 16 and 18 of the windshield curing apparatus 10, are palm buttons 46 which control the motor 38 as it rotates the divider panels 40 through the different chambers 28, 30, 32 and 34, as shown in FIG. 1.

The motor 38 rotates the axle 36 substantially 90 degrees during designated time intervals. The estimated time interval for a 90 degree rotation of the divider panels 40 from one chamber into another involves a period of time approximating a 3-4 minute index cycle. Although the conditions of the preferred embodiment allow for approximate 3-4 minute index cycles, said time intervals are not intended to be restricted thereby, but are dependant upon the environmental conditions maintained in each of the chambers 28, 30, 32 and 34 located within the main body 20 of the windshield curing apparatus As shown in FIG. 3, distinct and separate environments 14, 16 and 18 are maintained at predetermined temperature levels by heaters 61, 62 and 63 which connect to the main body 20 in three locations and a steam generator 65. The first environment 12 is maintained at room temperature and is used for loading and unloading of the windshields 11 into chamber 28. As the windshield holder assembly 50 in chamber 28 is rotated by the motor 38 into chamber 30, the windshield 11 is positioned into a second environment 14. A first heater unit 61 provides heat to the second environment 14 to substantially maintain a temperature between 200° F. and 260° F. to flash off the adhesive promoter's toluene carrier.

The windshield holder assembly 50 in chamber 30 is further rotated into chamber 32, where the windshield encounters a distinct third environment 16. A second heater unit 62 and a steam generator 65 may be used to pump heat and steam into the third environment 16 to substantially maintain a temperature between 150° F. and 200° F. providing a means of humidity between 80 and 90 percent to promote hydrolysis.

The windshield holder assembly 50 in chamber 32 may be further rotated into chamber 34 and into a fourth environment 18, where a third heater 63 pumps heat into said fourth environment 18 to substantially maintain a temperature between 200° F. and 250° F. for drying the windshield 11 and evaporating the water from the laminate. Finally, the windshield holder assembly 50 in chamber 34 may be rotated into chamber 28 for removal of the windshield 11 and the addition of another.

Once a windshield 11 has passed through the four separate and distinct curing environments 12, 14, 16 and 18 of the windshield curing apparatus 10, the windshield 11 may be removed from the apparatus 10 by a worker using hand held vacuum cups. After the worker places the hand held vacuum cups on the windshield 11, he may release the suction-hold between the vacuum cups 58 secured to the second end 56 of the support posts 52 and engaging the newly cured windshield 11, by pressing a foot pedal 60 which disengages the external vacuum pump 70 releasing the vacuum suction-hold by a method familiar in the art.

From the above discussion, it will be appreciated that the present invention provides a novel windshield curing apparatus and method for curing an adhesive promoter on a windshield in preparation for encapsulation. Whereby, the present invention provides an apparatus and method which shortens the period of time for curing an adhesive promoter on a windshield and does not involve the high costs of storing the windshield in high humidity rooms during the curing process.

Furthermore, the present invention provides a means whereby the curing of windshields produces a more consistent product with fewer defects and is no longer a labor intensive process. Thus, the present invention provides significant advantages over the prior art methods of curing windshields now in known use.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for curing an adhesive promoter onto glass, comprising the steps of:
   applying the adhesive promoter to the glass, said adhesive promoter having a solvent carrier;
   introducing the glass with the adhesive promoter applied thereto into a first chamber, said first chamber maintaining an environment with temperature between approximately 200° F. and 260° .F (93° C. and 127° C.) to flash off said solvent carrier;
   introducing the glass from the first chamber into a second chamber, said second chamber maintaining an environment for heating and humidifying the glass with temperature between approximately 150° F. and 200° F. (65° C. and 93° C.) and humidity between approximately 80 percent and 90 percent for hydrolysis to form a coating on the glass;
   introducing the glass from the second chamber into a third chamber, said third chamber maintaining an environment with temperature between approximately 200° F. and 250° F. (93° C. and 121° C.) to dry the glass and evaporate water from said coating; and
   removing the glass from the third chamber wherein each of said first, second and third chambers lie adjacent one another within a curing apparatus.

2. A method as defined in claim 1 wherein the solvent carrier of the adhesive promoter comprises toluene.

3. A method as defined in claim 1 further comprising the step of retaining said glass within each of said first, second and third chambers for a period of approximately 3 to 4 minutes.

4. A method as defined in claim 1 wherein each of said first, second and third chambers being separated from one another by a plurality of divider panels, said divider panels including sealing means for ensuring that each said chamber is environmentally separate and distinct.

5. A method as defined in claim 4 wherein said chambers are located about a central axis of said curing apparatus, and wherein said steps of introducing the glass into said first, second, and third chambers comprise rotating the glass about said central axis so as to pass sequentially through said chambers.

6. A method as defined in claim 1 wherein said glass is formed as a windshield.

7. A method for curing an adhesive promoter onto glass, comprising the steps of:
   applying the adhesive promoter to the glass, said adhesive promoter having a solvent carrier;
   introducing the glass with the adhesive promoter applied thereto into a first chamber, said first chamber maintaining an environment with temperature between approximately 200° F. and 260° F. (93° C. and 127° C.) to flash off said solvent carrier;

introducing the glass from the first chamber into a second chamber, said second chamber maintaining an environment for heating and humidifying the glass with temperature between approximately 150° F. and 200° F. (65° C. and 93° C.) and humidity between approximately 80 percent and 90 percent for hydrolysis to form a coating on the glass;

introducing the glass from the second chamber into a third chamber for between approximately 3 minutes to 4 minutes, said third chamber maintaining an environment with temperature between approximately 200° F. and 250° F. (93° C. and 121° C.) to dry the glass and evaporate water from said coating; and removing the glass from the third chamber, wherein each of said first, second and third chambers lie adjacent one an other within a curing apparatus.

8. A method as defined in claim 7 wherein the solvent carrier of the adhesive promoter comprises toluene.

9. A method as defined in claim 7 wherein each of said first, second and third chambers being separated from one another by a plurality of divider panels, said divider panels including sealing means for ensuring that each said chamber is environmentally separate and distinct.

10. A method as defined in claim 7 wherein said chambers are located about a central axis of said curing apparatus, and wherein said steps of introducing the glass into said first, second, and third chambers comprise angularly rotating the glass about said central axis so as to pass sequentially through said chambers.

11. A method as defined in claim 7 wherein said glass is formed as a windshield.

* * * * *

UNITED STATES PATENT AND TRADEMARK OFFICE
CERTIFICATE OF CORRECTION

PATENT NO. :     5,385,755
DATED      :     January 31, 1995
INVENTOR(S) :    Jack B. Staley It is certified that error appears in the above-identified patent and that said Letters Patent is hereby corrected as shown below:

```
    In column 5, line 14, after "apparatus", please insert
-- 10. --.
    In column 5, line 30, after "windshield", please insert
-- 11 --.
    In column 6, line 40, after "chamber", please insert
-- , --.
```

Signed and Sealed this

Eleventh Day of April, 1995

Attest:

BRUCE LEHMAN

*Attesting Officer*                    *Commissioner of Patents and Trademarks*